(12) United States Patent
Xiong et al.

(10) Patent No.: US 10,778,593 B2
(45) Date of Patent: Sep. 15, 2020

(54) VIRTUAL CABLE

(71) Applicant: Arista Networks, Inc., Santa Clara, CA (US)

(72) Inventors: Yunli Xiong, Fremont, CA (US); Hugh W. Holbrook, Palo Alto, CA (US); Xuanran Zong, Milpitas, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 15/247,724

(22) Filed: Aug. 25, 2016

(65) Prior Publication Data

US 2017/0163547 A1 Jun. 8, 2017

Related U.S. Application Data

(60) Provisional application No. 62/262,846, filed on Dec. 3, 2015.

(51) Int. Cl.
*H04L 12/833* (2013.01)
*H04L 12/935* (2013.01)
*H04L 12/26* (2006.01)

(52) U.S. Cl.
CPC ............. *H04L 47/31* (2013.01); *H04L 43/50* (2013.01); *H04L 49/30* (2013.01)

(58) Field of Classification Search
CPC .......... H04L 47/31; H04L 49/30; H04L 43/50
See application file for complete search history.

(56) References Cited

U.S. PATENT DOCUMENTS

| | | | | |
|---|---|---|---|---|
| 9,219,617 B2* | 12/2015 | Newton | ............... | H04L 12/4641 |
| 2005/0220033 A1* | 10/2005 | DelRegno | ............. | H04M 3/301 |
| | | | | 370/249 |
| 2013/0343181 A1* | 12/2013 | Stroud | .................... | H04L 43/50 |
| | | | | 370/229 |
| 2014/0280887 A1* | 9/2014 | Kjendal | .................. | H04L 43/12 |
| | | | | 709/224 |

* cited by examiner

*Primary Examiner* — Jianye Wu
(74) *Attorney, Agent, or Firm* — Haley Guiliano LLP

(57) ABSTRACT

Embodiments for communicating packets with a first port of a network element without the first port being communicatively coupled to another device (e.g., testing equipment) are described. In one embodiment, a packet is generated by testing equipment that is communicatively coupled to a second port of the network element. The packet includes a tag that uniquely identifies the first port. The network element communicates the packet from the second port to the first port based on the tag. The network element also removes the tag from the packet. The removal can occur before the packet is received at the first port or after the packet is received at an ingress module of the first port. In response to the removal of the tag, the network element enters the first port into a loopback mode that is internal to the first port.

23 Claims, 9 Drawing Sheets

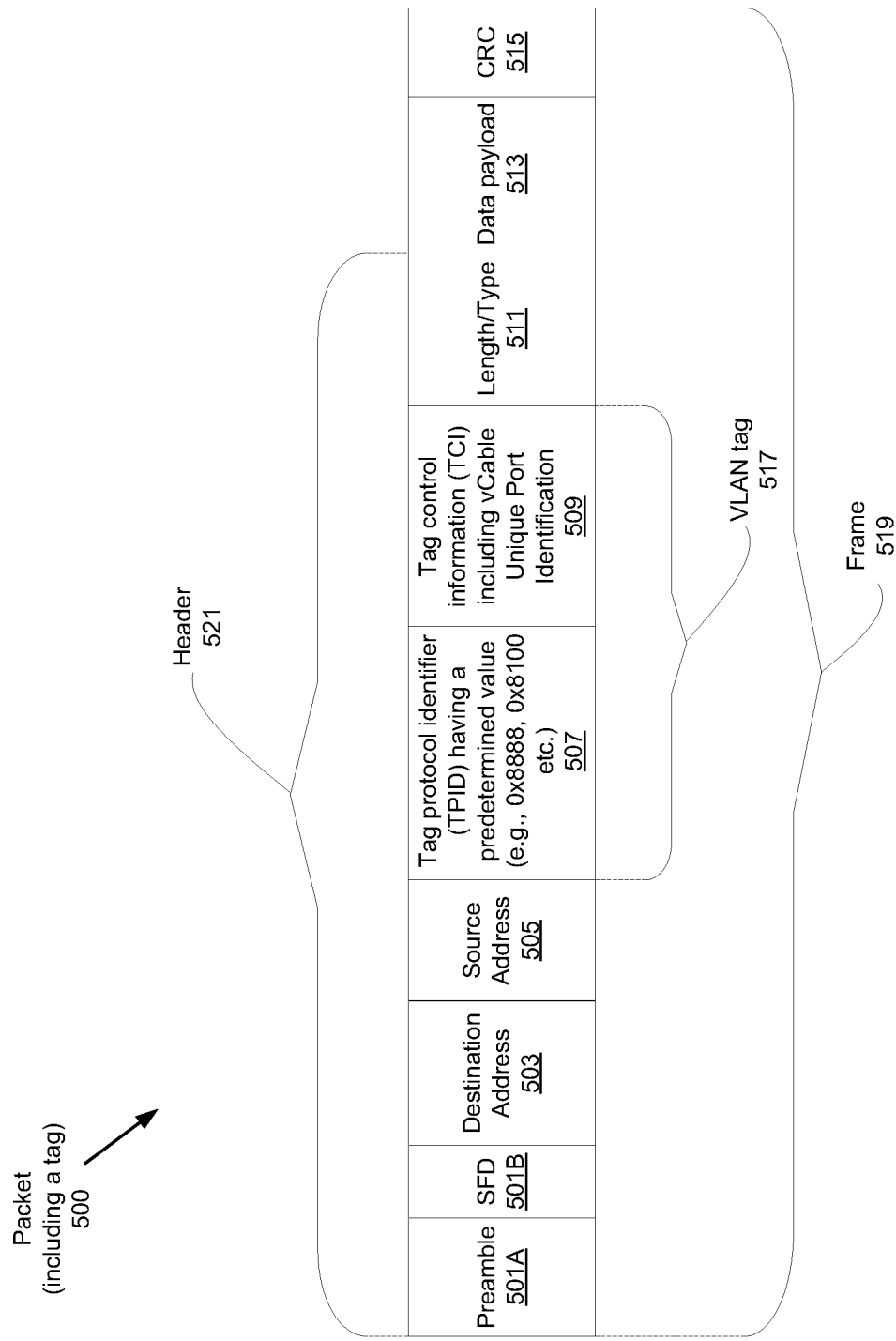

VIRTUAL CABLE

RELATED APPLICATIONS

Applicant claims the benefit of priority of prior, co-pending provisional application Ser. No. 62/262,846, filed Dec. 3, 2015, the entirety of which is incorporated by reference.

FIELD

This invention relates generally to data networking, and more particularly, to communicating packets with a port of a network element without the port of the network element being connected to another device by a physical cable.

BACKGROUND

Distributed low-latency network systems are now ubiquitous. These networks are used for various high-performance computing needs, such as, for example, finite element analyses, simulations, gaming, and other computationally-intensive applications. Such a distributed network can include one or more network elements. One problem associated with designing, configuring, or implementing this type of network is that each port of a network element that is to be included as part of the network may need to be tested before the network can be implemented. When such a network element has multiple ports (e.g., tens, hundreds, or thousands of ports), the resources and efforts associated with testing each of the ports of the network element can be quite large. Furthermore, when a networking environment is to include multiple network elements that each have multiple ports, the resources and efforts associated with this testing can be even larger.

Testing a network element that has multiple ports can require many components and equipment, whose numbers increase as the number of ports of the network element increases. These testing components and equipment include, but are not limited to, the equipment used to test the physical ports of network element, the equipment used to test the protocols applied to the ports of the network element, the cables used to test the ports, and the rack spaces or rack units associated with storing and using the testing equipment. In addition, testing the ports of the network element generally cannot be performed remotely—such testing generally requires physical presence of testing personnel, testing components, and testing equipment at one or more sites where the network element is located.

Due to the large amount of resources and efforts associated with testing the ports of a network element that has multiple ports, as well as the difficulty associated with remote testing of these ports, such testing remains suboptimal.

SUMMARY

Embodiments of methods, apparatuses, or systems for communicating packets with a port of a network element without the port of the network element being physically connected to any equipment are described. In an exemplary embodiment, a network element includes an apparatus for communicating a packet between multiple ports of the network element. Specifically, the apparatus communicates a packet that includes a first tag to a first port of the network element from a second port of the network element. The first tag includes a unique identification of the first port. The packet can be generated by testing equipment that is connected to the second port via a physical cable. The apparatus determines, based on the first tag, that the packet is to be communicated to the first port. Based on the determination, the apparatus communicates the packet that includes the first tag from the second port to the first port. The apparatus also removes the first tag from the packet. The apparatus can remove the first tag before the packet is received at the first port or in response to an ingress module of the first port receiving the packet. The apparatus configures the first port to be in a loopback mode that is internal to the first port.

In another exemplary embodiment, the apparatus communicates the packet that lacks the first tag from the first port to the second port. The apparatus further adds a second tag that includes the unique identification of the first port to the packet that lacks the first tag. The apparatus can add the second tag to the packet in response to the apparatus communicating the packet from the first port or before the apparatus communicates the packet from an egress module of the first port. The apparatus is further configured to communicate the packet that includes the second tag to the testing equipment from the second port.

Other methods, apparatuses, or systems are also described.

BRIEF DESCRIPTION OF THE DRAWINGS

The present invention is illustrated by way of example and not limitation in the figures of the accompanying drawings in which like references indicate similar elements.

FIG. 5 is a block diagram of one embodiment of a packet including a tag that can be processed by a network element for communicating the packet with a port of the network element without the port being connected to another device by a physical cable.

DETAILED DESCRIPTION

Figure 1:
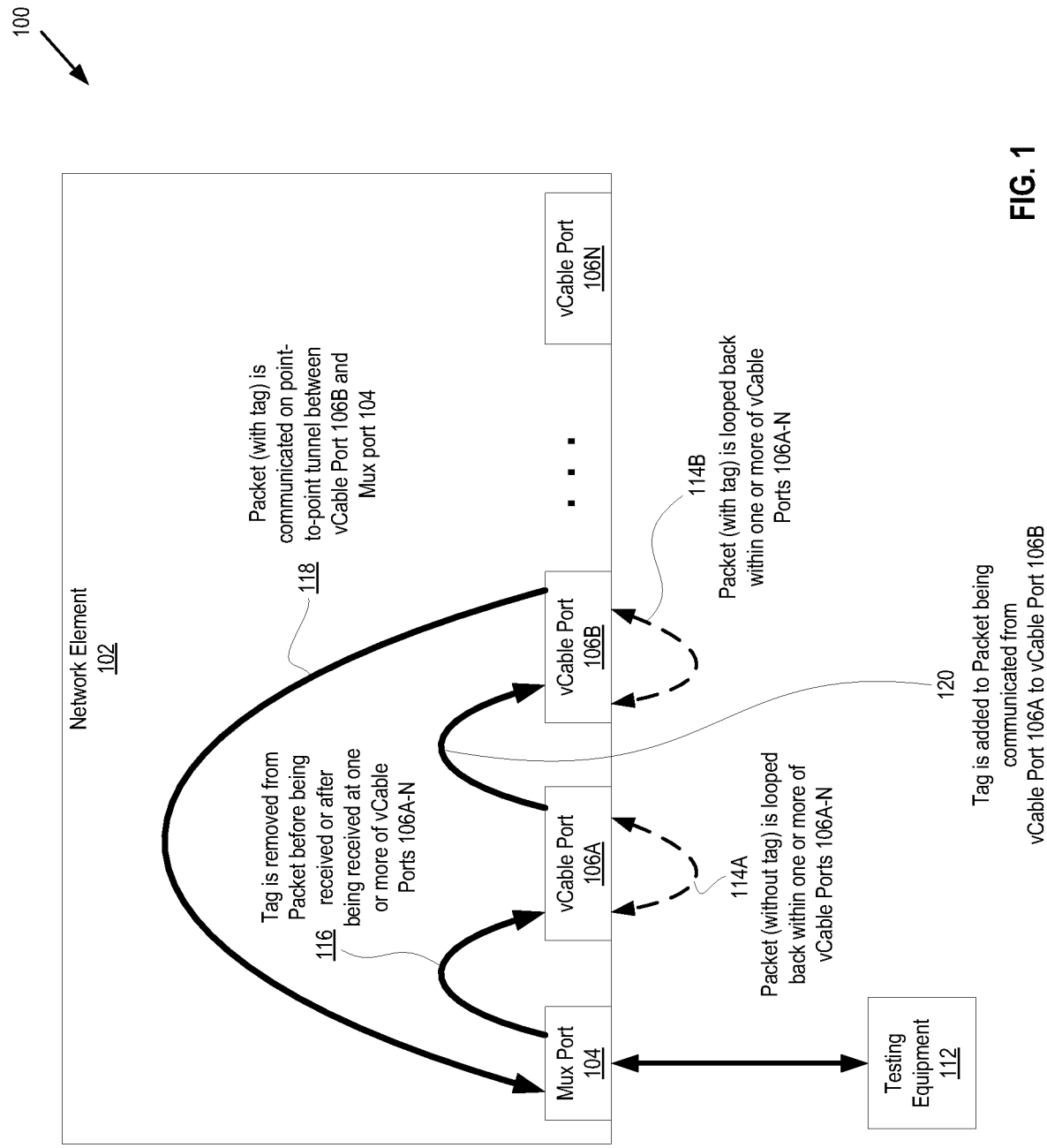
FIG. 1 is a block diagram of one embodiment of a system that includes a network element configured to communicate packets with a port of the network element without the port of the network element being connected to another device by a physical cable.

Embodiments of methods, apparatuses, or systems for communicating packets with a port of a network element without the port of the network element being physically connected to any equipment are described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment," "an embodiment," "alternate embodiment," "another embodiment," and their respective variations means that a particular feature, structure, or characteristic described in connection with the embodiment can be included in at least one embodiment of the invention. The appearances of the phrases "in one embodiment," "in an embodiment," "in alternate embodiment," "in another embodiment," and their respective variations in various places in the specification do not necessarily refer to the same embodiment.

In the following description and claims, the terms "coupled" and "connected," along with their derivatives, may be used. It should be understood that these terms are not intended as synonyms for each other. "Coupled" and its variations are used to indicate that two or more elements, which may or may not be in direct physical or electrical contact with each other, co-operate or interact with each other. "Connected" and its variations are used to indicate the establishment of communication between two or more elements that are coupled with each other. For example, two devices that are connected to each other are communicatively coupled to each other. "Communication" and its variations includes at least one of transmitting or forwarding of information to an element or receiving of information by an element.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," "device," and their respective variations are intended to refer generally to data processing systems rather than specifically to a particular form factor for the server, client, and/or device.

As used herein, a "packet" and its variations refer to a frame that exists at the Data Link Layer defined by the open systems interconnection model (OSI Model) or a packet that exists at the Network Layer defined by the OSI Model; a fragment of a frame or a fragment of a packet; or another type, arrangement, or packaging of data. A packet can be of fixed or variable length.

As used herein, a "port of a network element," "a port," and their respective variations refer to a network connector of a network element that is used for communicating one or more packets. A port can be a high-speed port, an Ethernet port, or any other known logical network connector of a network element suitable for communicating one or more packets. A port includes circuitry for receiving and/or transmitting one or more packets via a receive interface and/or a transmit interface of the port, respectively. A port can include a receive interface and a transmit interface, where the receive interface is used to receive a packet and the transmit interface is used to transmit a packet.

As used herein, a "MUX port" and its variations refer to a port of a network element that is connected to another device. For example, the MUX port is connected to testing equipment by a physical cable that enables communication between the MUX port and the testing equipment.

As used herein, a "virtual cable port," a "vCable port," and their respective variations refer to a port of a network element that is not connected to another device by a physical cable. For example, the vCable port is not physically connected to testing equipment by a physical cable, and as a result, there is no communication established between the testing equipment and the vCable port.

As used herein, a "packet processor," "network processor,", and their respective variations refers to one or more processors that are used to process packets that are received or transmitted by one or more ports associated with this packet processor. The packet processor includes circuitry for handling, processing, and/or communicating one or more packets. Circuitry of a packet processor can include a number of execution units, logic circuits, and/or software for handling, processing, and/or communicating the one or more packets. For example and in one embodiment, circuitry of a packet processor that implements one or more functionalities of the port can be embodied in programmable or erasable/programmable devices, a field-programmable gate array (FPGA), a gate array or full-custom application-specific integrated circuit (ASIC), or the like. The functionalities of the packet processor can be performed using, for example, micro-code of a complex instruction set computer (CISC), firmware programmed into programmable or erasable/programmable devices, the configuration of an FPGA, the design of a gate array or full-custom ASIC, or the like.

As used herein, an "ingress module," and its respective variations refer to processing logic of the packet processor that is used to perform switching and/or other processing functionality on an incoming packet being received by a port associated with the packet processor. The ingress module can also be used to modify the incoming packet. For example, and in one embodiment, the ingress module can process an incoming packet received on a port associated with the packet processor.

As used herein, an "egress module" and its respective variations refer to processing logic of the packet processor that is used for transmitting an outgoing packet by a port associated with the packet processor. In one embodiment, the egress module is used to perform switching and/or other processing functionality. The egress module can also be used to modify the outgoing packet. For example and in one embodiment, the egress module can process an outgoing packet to transmit the outgoing packet from a port associated with the packet processor.

As used herein, a "loopback mode" and its variations refer to a specific operational state of a port of a network element. When a port is in a loopback mode, the networking element transmits an outgoing packet from a transmit interface of the port to the receive interface of the same port. In this way, the network element enables internal data communication within the port.

Generally, testing multiple ports of a network element will test each of these ports. Each port can be individually tested using a physical connection between the respective port and the testing equipment. The physical connection can be a physical cable (e.g., a wire) that provides the electrical communication between the port and the testing equipment. In some situations, the physical cable is inserted into the port and into the testing equipment to establish the communication. For a network element that includes multiple ports, the resources and efforts associated with testing each of its ports can be quite large. Moreover, in some situations, the ports cannot be tested remotely. This is because of the need to physically connect and test each of the ports. The embodiments described herein can assist with reduction of some of the costs and resources associated with the testing of multiple ports of a network element by enabling testing of one or more ports of the network element that are not physically connected to testing equipment. This feature of testing one or more ports of the network element that are not physically connected to testing equipment is achieved with one port of the network element that is connected to the testing equipment. The embodiments described herein can also assist with remote testing of one or more ports of a network element that are not physically connected to testing equipment with one port of the network element that is connected to the testing equipment.

Embodiments of methods, apparatuses, or systems for communicating packets with a port of a network element without the port of the network element being connected to another device by a physical cable are described. In one embodiment, a network element communicates a packet with a vCable port of the network element using a MUX port of the network element.

In one embodiment, the vCable port is not connected to another device (e.g., testing equipment) by a physical cable. The MUX port, in one embodiment, is connected to testing equipment via a physical cable and is able to communicate with the testing equipment using this physical cable. In this embodiment, the testing equipment generates and communicates a packet to the MUX port. The network element further processes the packet received at the MUX port and forwards the packet from the MUX port to the vCable port based on the results of the processing performed by the network element. In one embodiment, the generated packet includes a first tag that is a unique identification of the vCable port. In one embodiment, the network element processes the first tag to determine that the packet is to be communicated to the vCable port. The network element communicates the tagged packet from the MUX port to the vCable using a tunnel mechanism that is configured between the MUX port and the vCable port.

The network element can remove the first tag from the packet. By removing this tag, other header information in the packet is used to forward the packet within the network element. In one embodiment, the network element removes the first tag from the packet during communication of the packet that includes the first tag to the vCable port from the MUX port. In one embodiment, the network element removes the tag before the packet is received at a transmit interface of the vCable port. As a first example, and in one embodiment, the network element removes the tag in response to an egress module of a packet processor associated with the vCable port receiving the packet from an ingress module of a packet processor associated with the MUX port. As a second example, and in one embodiment, the network element removes the tag prior to an ingress module of a packet processor associated with the MUX port communicating the packet to an egress module of a packet processor associated with vCable port.

In one embodiment, the network element can configure the vCable port into a loopback mode. In one embodiment, the network element configures the vCable port to enter into the loopback mode prior to the testing equipment communicating the packet to the MUX port. In one embodiment, when the vCable port is in the loopback mode, the network element communicates the packet from the transmit interface to the receive interface of the vCable port, without transmitting the packet out of a physical interface of the port. The loopback mode can be configured as part of the test setup. For example, and in one embodiment, the network element can configure the vCable port to enter into the loopback mode in response to the vCable port receiving the packet. The network element can further configure the vCable port out of the loopback mode.

Furthermore, the network element can communicate the untagged packet from the vCable port to the MUX port or to another vCable port. In one embodiment, the network element communicates the untagged packet from the vCable port to the MUX port or to another vCable port according to other header information within the packet. In one embodiment, the network element can add a tag indicating another vCable port, where the network element forwards this tagged packet to that other vCable port. In another embodiment, when the network element communicates the untagged packet from the vCable port to the MUX port, the network element adds a second tag that includes the unique identification of the vCable port to the untagged packet during the communication of the untagged packet from the vCable port to the MUX port. In one embodiment, the tagging of the packet with the second tag is used so that the test equipment can identify the packets as part of the vCable port testing. The network element, in one embodiment, adds the second tag using the ingress module of a packet processor associated with the vCable port or the egress module of a packet processor associated with the MUX port. In one embodiment, the network element communicates this newly tagged packet to the testing equipment from the MUX port. For example, and in one embodiment, the network element communicates this newly tagged packet from the egress module of a packet processor associated with MUX port to a transmit interface of the MUX port, which in turn communicates the newly tagged packet to the testing equipment for processing.

The network element, in one embodiment, communicates the packet (with or without tags) between the MUX port and the vCable port using a tunnel mechanism. A tunnel mechanism creates a point-to-point (P2P) link that consists of two connection endpoints without intervening connection endpoints. For example, and in one embodiment, the tunnel mechanism between a MUX port and specific vCable port is a P2P link that enables those two ports to communicate with each other. The tunnel mechanism can include at least one of a P2P tunneling mechanism, a Q-in-Q tunneling mechanism, a multiprotocol label switching (MPLS) mechanism, a Generic Route Encapsulation (GRE) mechanism, a point-to-point tunneling protocol (PPTP) (e.g., as described in Request for Comment (RFC) 2367), or another type of tunneling protocol. The network element can configure the corresponding tunnel mechanisms between the MUX port and the respective vCable ports as part of the test setup. For example, and in one embodiment, the network element generates and configures a tunnel mechanism between a MUX port and a specific vCable port prior to the packet including the tag being communicated by testing equipment to the MUX port.

In one embodiment, the packet is a frame, such as an Ethernet frame or a point-to-point protocol (PPP) frame. In one embodiment, the network element counts packets that are processed by the ingress or egress modules of a packet processor associated with the vCable or MUX ports.

FIG. 1 is a block diagram of one embodiment of a system 100 that includes a network element 102 configured to communicate packets with one or more vCable ports 106A-N of the network element without the one or more vCable ports 106A-N being connected to another device (e.g., testing equipment 112) by a physical cable. While in one embodiment, the MUX port 104 is described as being connected to another device such as the testing equipment 112 by a physical cable, in alternate embodiments the MUX port 104 can be coupled to another device using a wireless interface and/or via one or more other network devices (not illustrated). If the MUX port 104 is coupled to another device by a wireless interface, the vCable port(s) 106A-N are not coupled to another device using a wired or wireless interface.

The network element 102 is a network element that allows network access from one network to another. For example and in one embodiment, a network element 102 can be a router, switch, or another type of network element that allows network access from one network to another. The network element 102 can be a virtual or physical network element. In one embodiment, the network element 102 includes a data plane (not illustrated) and a control plane (not illustrated).

In one embodiment, the network element 102 receives, processes, and transmits network data using various configuration data (e.g., forwarding, security, quality of service (QoS), and other network traffic processing information). For example, for each received packet of the network traffic, the network element 102 determines a destination address of that packet, looks up the requisite information for that destination in one or more tables stored in a data plane of the network element 102, and transmits the packet out the proper outgoing port. In one embodiment, the network element 102 includes one or more ports. For example, and in one embodiment, each of the MUX port 104 and the vCable ports 106A-N are ports of the network element 102. The MUX port 104 is further coupled to a testing equipment 112. In one embodiment, these ports are used to receive and transmit network traffic (e.g., a packet, a frame, etc.). In one embodiment, each of the ports includes a receive interface and a transmit interface for receiving and transmitting network traffic to or from the network element. In one embodiment, the ports can be the same or different physical media (e.g., copper, optical, wireless, and/or another physical media). In one embodiment, the network element 102 includes one or more packet processors (not illustrated) to perform various functions of the network element 102. For example, and in one embodiment, the one or more packet processors can insert or add tags into the packets; analyze tags to determine which one of vCable ports 106A-N is to receive a packet; remove tags from a packet; communicate packets between the testing equipment 112, the MUX port 104, and one or more of the vCable ports 106A-N; and activate or deactivate a loopback mode for one or more of the vCable ports 106A-N. In one embodiment, each of the one or more packet processors is associated with at least one port of the network element 102 (e.g., the MUX port 104, one or more vCable ports 106A-N, or other ports). In a further embodiment, each of the one or more packet processors includes an ingress module and an egress module for processing packets received by or transmitted to at least one of the ports of the network element 102.

In one embodiment, the testing equipment 112 can be any known testing equipment suitable for testing ports of a networking element, including but not limited to, a network performance testing appliance that includes a packet generator and testing equipment that includes a packet analyzer. In one embodiment, the testing equipment includes processing logic that enables generation of a packet for testing one or more of the vCable ports 106A-N.

In one embodiment, the testing equipment 112 can add a first tag into the packet used to test one of the vCable ports 106A-N. In this embodiment, the first tag identifies which one of the vCable ports 106A-N is to be tested. For example, and in one embodiment, the first tag includes a first unique identification for vCable port 106A or a second unique identification for vCable port 106B, and so on. In one embodiment, the testing equipment 112 inserts the first tag into the generated packet after the testing equipment 112 generates the packet. In an alternate embodiment, the testing equipment 112 generates the packet with the first tag. In yet another embodiment, the network element 102 inserts the first tag into the generated packet. In this embodiment, if the network element 102 inserts the first tag into the generated packet, the testing equipment 112 communicates, to the network element 102, the untagged packet and information specifying which one of vCable ports 106A-N is to be tested. The network element 102 generates and inserts the first tag into the packet based on the received packet and the received information. More details about the insertion of a tag into the packet are described below in connection with FIGS. 3 and 5.

The network element 102, in one embodiment, receives the tagged packet at the MUX port 104. In response to the network element 102 receiving the tagged packet, the network element 102 processes the tag to determine which of the vCable ports 106A-N are to receive the packet. For example, and in one embodiment, the network element 102 processes the first tag and determines that the vCable port 106A is to receive the generated packet.

For the sake of brevity and clarity, the detailed description refers to the vCable port 106A as a representative one of the vCable ports 106A-N. It is to be appreciated that the detailed description applies to one, some, or all of the vCable ports 106A-N. When another one of the vCable ports 106A-N other than the vCable port 106A is required for explaining one or more of the concepts set forth in this detailed description, the detailed description will refer to the vCable port 106B as the other one of the vCable ports 106A-N.

In one embodiment, the network element 102 removes the first tag from the packet in an operation 116 when the network element 102 communicates the packet from the MUX port 104 to the vCable port 106A. In an embodiment, the network element 102 removes the first tag from the packet prior to a transmit interface of the vCable port 106A receiving the packet.

In one embodiment, the network element 102 transmits the untagged packet with the transmit interface of the vCable port 106A. In this embodiment, because the vCable port 106A is in the loopback mode 114A, the untagged packet is looped back to the receive interface of the vCable port 106A from the transmit interface of the vCable port 106A. This internal looping 114A of the untagged packet enables testing of the capabilities of the vCable port 106A without the vCable port 106A having a physical cable or other device coupled to this port. The network element 104 can forward the untagged packet to the MUX port 104 or can forward the untagged packet to another vCable port 106B or 106C-N.

The network element 102 can communicate (operation 120) the packet from the vCable port 106A to another specified one of the vCable ports 106A-N (e.g., vCable port 106B). In one embodiment, the network element 102 can add a tag indicating another vCable port, where the network element forwards this tagged packet to that other vCable port 106A-N (e.g., vCable port 106B). At operation 120 of the illustrated embodiment shown in FIG. 1, the network element 102 adds to the packet, a second tag indicating that the vCable port 106B is to receive the packet. The second tag is similar to the first tag, but indicates that the vCable port 106B is to receive the packet. In one embodiment, an ingress module of a packet processor associated with vCable port 106A adds this second tag to the packet. The network element 102 communicates the tagged packet, which is now tagged with the second tag, from the ingress module of a packet processor with the vCable port 106A to a transmit interface of the vCable port 106B. In this embodiment, because the vCable port 106B is in the loopback mode 114B, the tagged packet (with the second tag) is looped back to the receive interface of the vCable port 106B from the transmit interface of the vCable port 106B. This internal looping 114B of the tagged packet (with the second tag) enables the network element 102 to forward the tagged packet (with the second tag) back to the MUX port 104 via a point-to-point (P2P) tunnel between the MUX port 104 and vCable port 106B. In this way, the previously untagged packet that was used to test the vCable port 106A, which is now the tagged packet (with the second tag), can be communicated (operation 118) by the network element 102 from the vCable port 106B to the MUX port 104. Additional details about P2P tunnels between the MUX port 104 and the vCable ports 106A-N is described below in connection with at least FIG. 2.

In one embodiment (not illustrated), if the network element 102 forwards the untagged packet back to MUX port 104, the network element 102 can add a third tag that is similar to or the same as the first tag to the packet before a transmit interface of the MUX port 104 receives the generated packet. In this embodiment, this third tag is used to identify which one of the vCable ports 106A-N was used in the testing. For example, and in one embodiment, this third tag can be used to show that the vCable port 106A was the tested port. In one embodiment, the ingress module of a packet processor associated with the tested one of vCable ports 106A-N or the egress module of a packet processor associated with the MUX port 104 adds this third tag to the packet.

In one embodiment, a transmit interface of the MUX port 104 receives the tagged packet and the networking element 102 subsequently forwards this received packet to the testing equipment 112. The testing equipment 112 can analyze the packet to determine whether the tested vCable ports 106A-B are functioning properly. For example, and in one embodiment, the tested vCable port 106A is deemed to be a properly functioning port of the network element 102 when the generated packet is successfully communicated between the testing equipment 112, the MUX port 104, and the vCable ports 106A-B. In this example, the testing equipment 112 is the initial origin and the final destination of the generated packet. In another embodiment, another device (not illustrated) can receive the packet if the packet is transmitted out a different MUX port than the one that received it.

In one embodiment, each of the first, second, and third tags can be used to determine how a packet is to be treated, and subsequently forwarded, by the network element 102. In this way, the network element 102 can add a tag to an untagged packet based on the absence of the tag, and the network element 102 can remove a tag from a tagged packet based on the presence of the tag. Furthermore, and in one embodiment, tagged packets are communicated within the network element 102 using the tunnels, as described in further detail below in connection with FIG. 2. In contrast, and in this embodiment, untagged packets are communicated within the network element 102 via forwarding operations of the network element 102 (e.g., the network element 102 processes and forwards an untagged packet in the same manner as another packet received on a receive interface of a port of the network element). Additional details about forwarding of tagged and untagged packets is described below in connection with at least one of FIG. 2 or 3.

In one embodiment, the network element 102 maintains one or more counters for the packets that are looped through each vCable port 106A-N and packets received and/or transmitted through the MUX port 104. In one embodiment, a tester can use these counters to determine if one or more of the vCable ports 106A-N is dropping packets or is performing properly.

Figure 2:
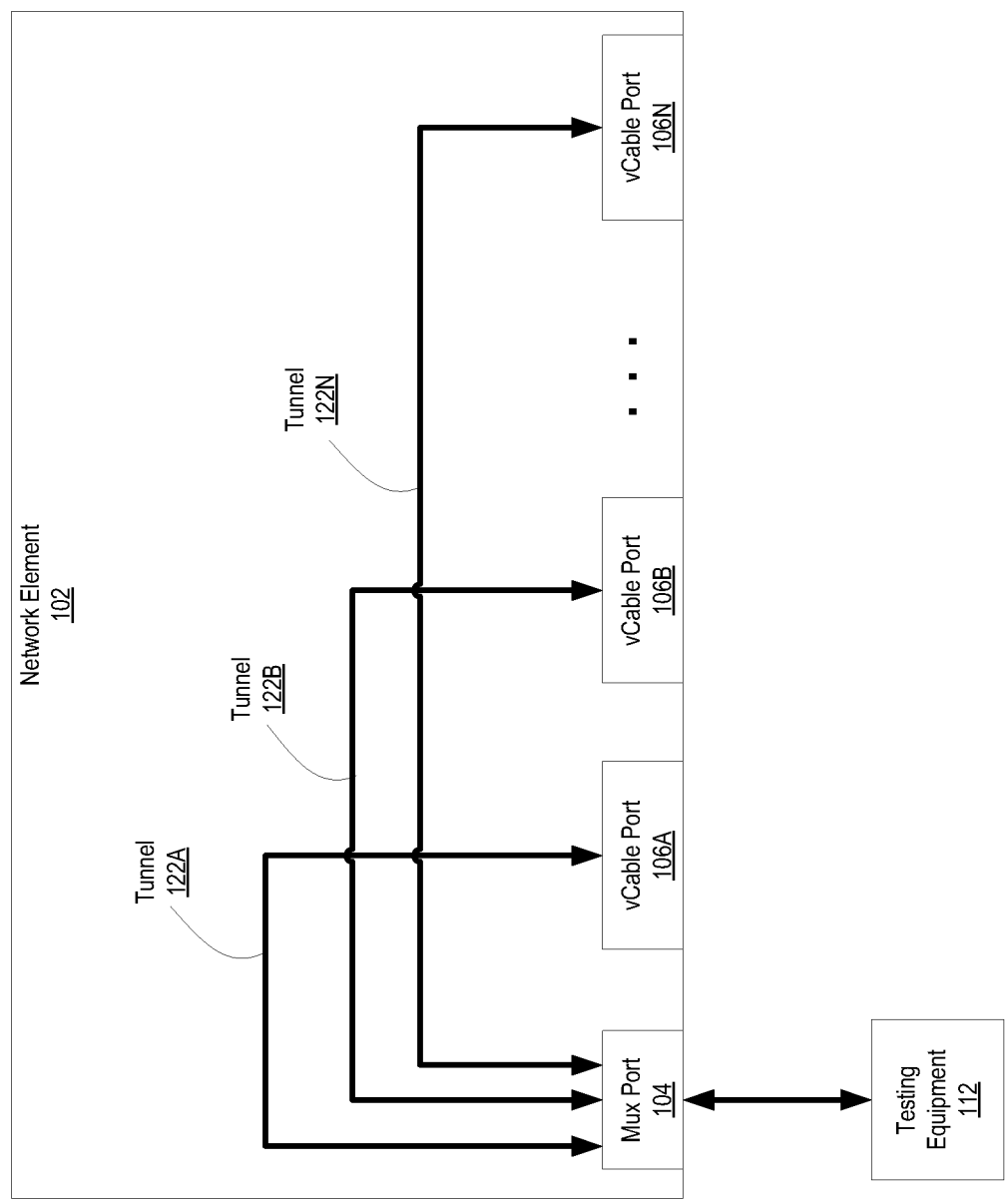
FIG. 2 is a block diagram of one embodiment of a system that includes a network element configured with tunnel mechanisms for communicating packets with one or more vCable ports of the network element without the one or more vCable ports being connected to another device by a physical cable.

FIG. 2 is a block diagram of one embodiment of a system 200 that includes a network element 102 configured with tunnels 122A-N for communicating packets with one or more vCable ports 106A-N without these vCable ports 106A-N being connected to another device (e.g., testing equipment 112) by a physical cable. While in one embodiment, the MUX port 104 is described as being connected to another device such as the testing equipment 112 by a physical cable, in alternate embodiments the MUX port 104 can be coupled to another device using a wireless interface and/or via one or more other network devices (not illustrated).

In FIG. 2, the network element 102 includes a plurality of tunnels 122A-N. In one embodiment, each of the tunnels 122A-N corresponds to one of the vCable ports 106A-N. For example, and in one embodiment, the tunnel 122A corresponds to the vCable port 106A, the tunnel 122B corresponds to the vCable port 106B, and so on.

In one embodiment, each of the tunnels 122A-N is a communication path between the MUX port 104 and a corresponding one of the vCable ports 106A-N. For example, and in one embodiment, the tunnel 122A is a first communication path between the MUX port 104 to the vCable port 106A, the tunnel 122B is a second communication path between the MUX port 104 to the vCable port 106B, and so on. In one embodiment, the network element 102 creates the tunnels 122A-N as point-to-point (P2P) connection(s) that consists of two connection endpoints with no intervening connection endpoints in between. Thus, the network element 102 uses the first communication path that is tunnel 122A exclusively for communications between the MUX port 104 and the vCable port 106A. In one embodiment, a packet processor associated with the MUX port 104 port processes a tagged packet received from testing equipment 112 and determines that the packet is to be forwarded to the vCable port 106A. In this example, the packet processor places the packet on the appropriate tunnel 122A for forwarding to the specified vCable port 106A.

In at least one of the embodiments described above in connection with FIG. 1, the testing equipment 112 communicates the packet to the MUX port 104 of the network element 102. In a further embodiment, the network element 102 communicates the packet between the MUX port 104 and the vCable ports 106A-N using one of the corresponding tunnel mechanisms 122A-N. For example, and in one embodiment, the network element 102 communicates the generated packet (with or without the tag) between the MUX port 104 to the vCable port 106A using tunnel 122A.

In one embodiment, the network element 102 maintains one or more counters of the packets communicated on each of the tunnels 122A-N between the MUX port 104 and the corresponding vCable ports 106A-N.

Figure 3:
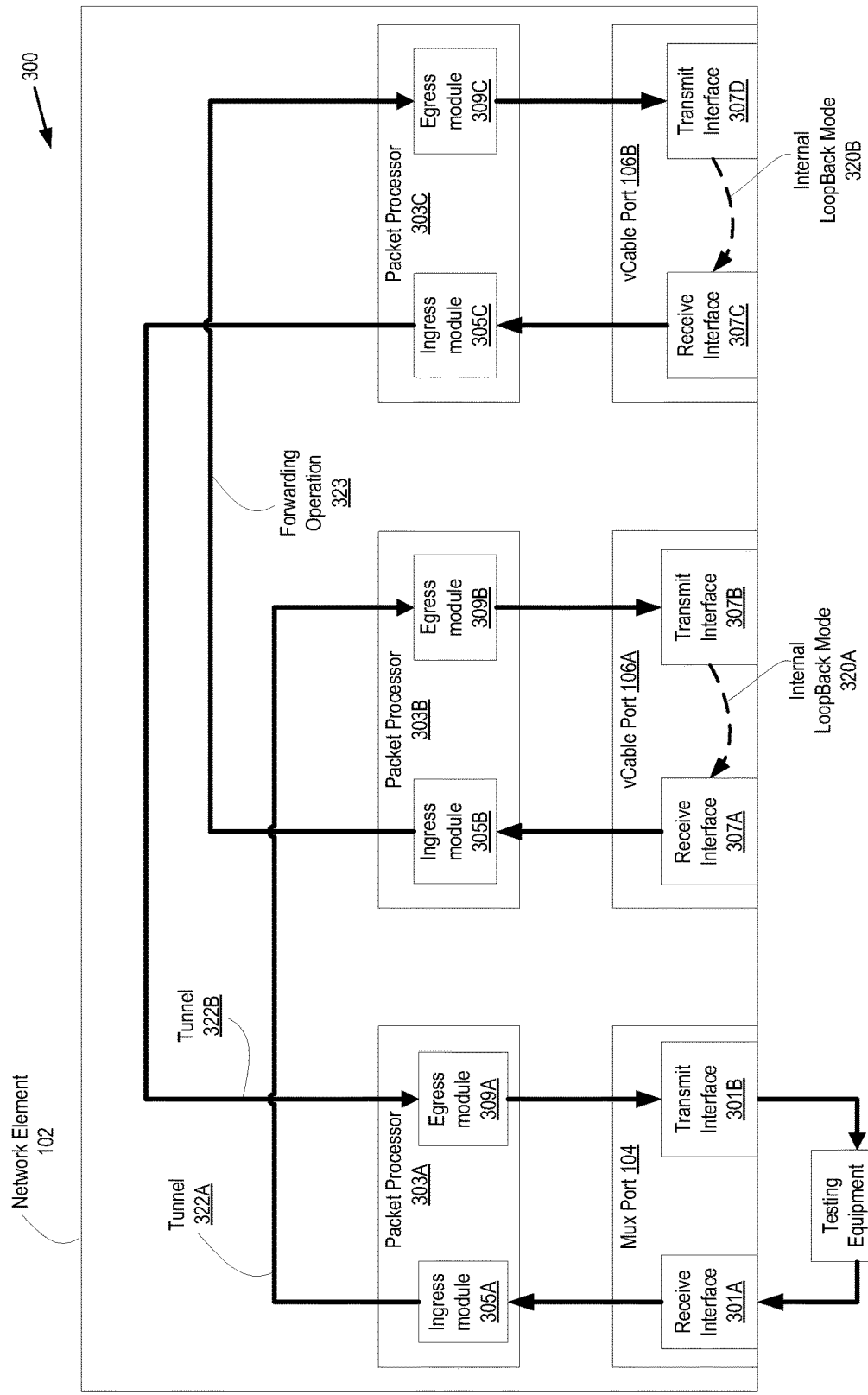
FIG. 3 is a block diagram of one embodiment of a system, which includes a network element that includes packet processors configured with ingress modules and egress modules for communicating packets with a port of the network element without the port of the network element being connected to another device by a physical cable.

FIG. 3 is a block diagram of one embodiment of a system 300, which includes a network element 102 that includes packet processors 303A-C configured with ingress modules 305A-C and egress modules 309A-C for communicating packets with a vCable port 106A of the network element 102 without the vCable port 106A of the network element being connected to another device (e.g., testing equipment 112) by a physical cable. While in one embodiment, the MUX port 104 is described as being connected to another device such as the testing equipment 112 by a physical cable, in alternate embodiments the MUX port 104 can be coupled to another device using a wireless interface and/or via one or more other network devices (not illustrated).

In one embodiment, each of packet processors 303A-C includes processing logic (e.g., hardware, software, or a combination of both hardware and software) that can be configured to perform the functions of at least one of the ingress modules 305A-C and/or egress modules 309A-C. In one embodiment, packet processor 303A is associated with the MUX port 104, such that the ingress module 305A and the egress module 309A are used for processing packets communicated with or by MUX port 104. In one embodiment, packet processor 303B is associated with the vCable port 106A, such that the ingress module 305B and the egress module 309B are used for processing packets communicated with or by vCable port 106A. In one embodiment, packet processor 303C is associated with the vCable port 106B, such that the ingress module 305C and the egress module 309C are used for processing packets communicated with or by vCable port 106B.

In one embodiment, and as explained above, the testing equipment 112 generates a packet for testing of vCable port 106A. In FIG. 3, only vCable ports 106A-B are referred to for the sake of brevity. It will be appreciated that the discussion provided in connection with FIG. 3 applies to one or multiple vCable ports of network element 102.

In one embodiment, the network element 102 receives, at a receive interface 301A of the MUX port 104, the packet from the testing equipment 112. In one embodiment, the received packet includes a first tag, as described above in connection with at least one of FIG. 1 or 2.

The receive interface 301A of the MUX port 104 forwards the tagged packet (with the first tag) to the packet processor 303A for processing. In one embodiment, the ingress module 305A processes this tagged packet to determine that the vCable port 106A is to receive the packet. In a further embodiment, the packet processor 303A forwards the tagged packet using a tunnel between the MUX port 104 and the vCable port 106A. For example and in one embodiment, the packet processor 303A uses a tunnel 322A, which is the same as or similar to the tunnel 122A that is described above in FIG. 2. In one embodiment, the packet processor 303A forwards the tagged packet having the first tag to the packet processor 303B associated with the vCable port 106A. In a further embodiment, the ingress module 305A forwards the tagged packet to an egress module 309B of the packet processor 303B. In one embodiment, the ingress module 305A forwards the tagged packet using the tunnel 322A configured between the ingress module 305A and egress module 309B.

Communication of the packet having the first tag from the packet processor 303A to the packet processor 303B can include removal of the first tag from the packet by either of the packet processors 303A-B. For example and in one embodiment, either the ingress module 305A or the egress module 309B can remove the first tag from the packet. In one embodiment, the ingress module 305A removes the first tag from the packet before the ingress module 305A forwards the packet to the egress module 309B. The ingress module 305A, in one embodiment, removes the first tag from the packet in response to the packet processor 303A determining that the packet is to be communicated to the vCable port 106A. In an alternate embodiment, the egress module 309B removes the first tag from the packet after the packet is received by the packet processor 303B.

After the untagged packet is received by the packet processor 303B, the egress module 309B provides the untagged packet to a transmit interface 307B of the vCable port 106A. In one embodiment, the vCable port 106A is in a loopback mode 320A. When the vCable port 106A is in the loopback mode 320A, the network element 102 transmits the untagged packet from the egress module 309B and through the transmit interface 307B. In one embodiment, when the vCable port 106A is in the loopback mode 320A, the packet is looped back to the receive interface 307A without passing over a physical wire. The receive interface 307A forwards the untagged packet to the ingress module 305B. The network element 102 can configure the loopback mode 320A of this port 106A as part of the test setup phase. In one embodiment, the configuring of the vCable port 106A by the network element 102 is performed prior to the network element 102 receiving the packet at the receive interface 301A of the MUX port 104.

The packet processor 303B forwards the untagged packet to the packet processor 303C in response to the ingress module 305B receiving the untagged packet from the receive interface 307A of the vCable port 106A. In one embodiment, the ingress module 305B forwards the untagged packet to an egress module 309C of the packet processor 303C associated with the vCable port 106B. For example and in one embodiment, the packet processor 303B forwards the untagged packet to the packet processor 303C via a forwarding operation 323. In this example, the packet processor 303B processes and forwards the untagged packet in the same manner as another packet received on the receive interface 307A of vCable port 106A and forwarded to the packet processor 303C.

In one embodiment, the ingress module 305B adds, to the untagged packet, a second tag indicating that the vCable port 106B is to receive the packet. The second tag is similar to the first tag, but indicates that the vCable port 106B is to receive the packet. The packet processor 303B communicates the tagged packet, which is now tagged with the second tag, from the ingress module 305B to the egress module 309C of the packet processor 303C associated with the vCable port 106B. After the tagged packet is received by the packet processor 303C, the egress module 309C provides the tagged packet to a transmit interface 307D of the vCable port 106B. In one embodiment, the vCable port 106B is in a loopback mode 320B. When the vCable port 106B is in the loopback mode 320B, the network element 102 transmits the tagged packet from the egress module 309C and through the transmit interface 307D. In one embodiment, when the vCable port 106B is in the loopback mode 320B, the tagged packet is looped back to the receive interface 307C of the vCable port 106B from the transmit interface 307D of the vCable port 106B. The receive interface 307C forwards the tagged packet to the ingress module 305C. The network element 102 can configure the loopback mode 320B of this vCable port 106B as part of the test setup phase. In an embodiment, the configuring of the vCable port 106B by the network element 102 is performed prior to the network element 102 receiving the packet at the receive interface 301A of the MUX port 104.

The internal looping 320B of the tagged packet enables the network element 102 to forward the tagged packet back to the MUX port 104 via a point-to-point (P2P) tunnel 322B between the MUX port 104 and vCable port 106B. In this way, the previously untagged packet that was used to test the vCable port 106A, which is now the tagged packet (with the second tag), can be communicated by the network element 102 from the vCable port 106B to the MUX port 104. The P2P tunnel 322B is similar to or the same as the tunnel 122B that is described above in connection with FIG. 2.

As explained earlier, the ingress module 305C of the packet processor 303C receives the tagged packet having the second tag from the receive interface 307C of the vCable port 106B. In one embodiment, the ingress module 305C forwards the tagged packet (with the second tag) to the packet processor 303A in response to the ingress module 305C receiving the tagged packet. In one embodiment, the ingress module 305C forwards the tagged packet to an egress module 309A of the packet processor 303A. In a further embodiment, the ingress module 305C forwards the packet to the egress module 309A via the tunnel 322B, which is similar to or the same as the tunnel 122B described above in connection with FIG. 2.

In one embodiment, after the tagged packet is received by the packet processor 303A, the egress module 309A transmits this tagged packet out the transmit interface 301B of the MUX port 104. In one embodiment, the transmit interface 301B transmits the tagged packet to the testing equipment 112.

In one embodiment, the network element 102 counts the packets that are communicated by the ingress modules 305A-C and/or egress modules 309A-C. In one embodiment, different counters can be used to count the packets at the various stages of processing as the packets are forwarded from the MUX port 104, through the ingress 305A-C and egress 309A-C of the packet processors 303A-C, the vCable ports 106A-B, and back through the MUX port 104.

Figure 4A:
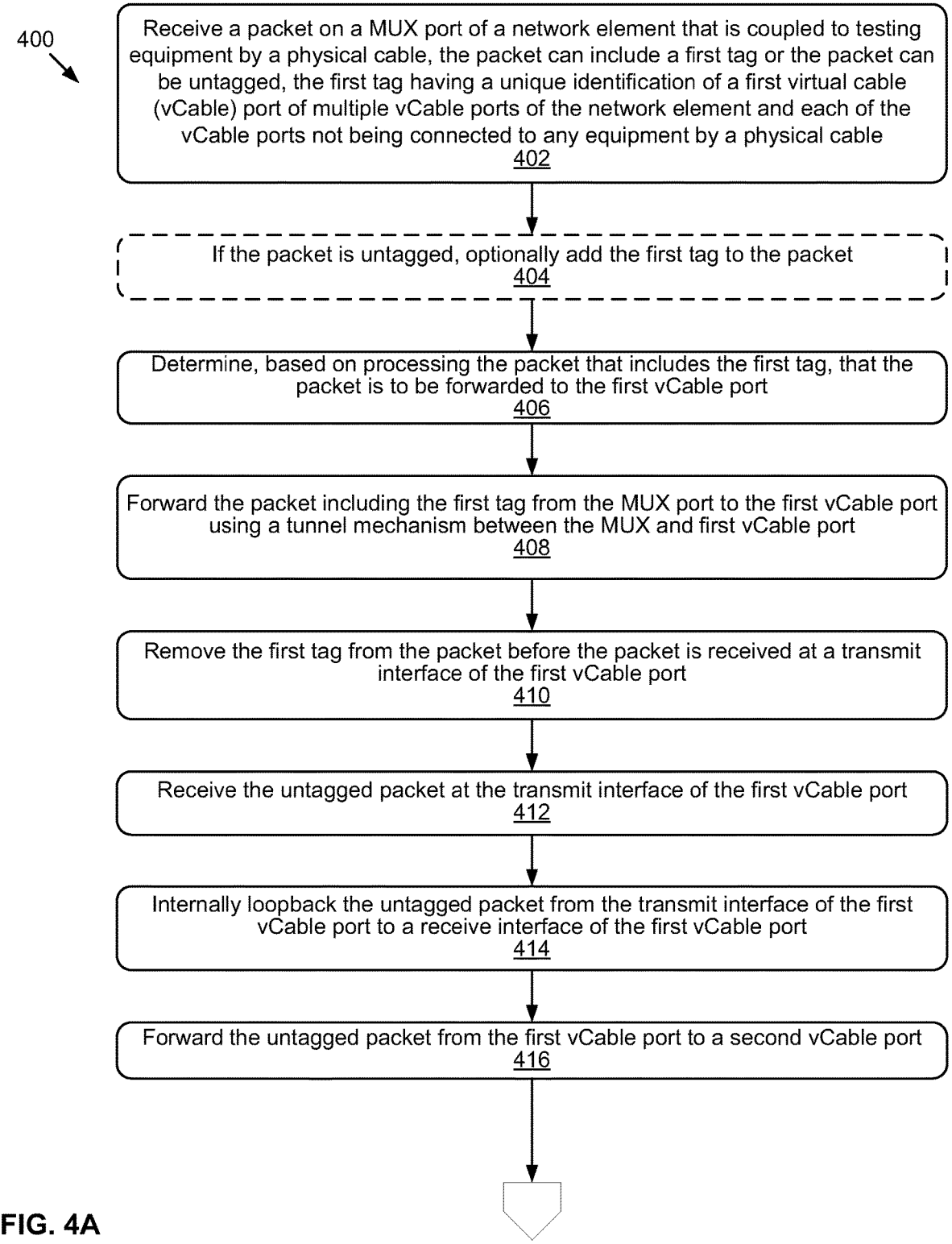
FIGS. 4A-4B illustrate flow diagrams of one embodiment of a process of communicating packets with a port of a network element without the port of the network element being connected to another device by a physical cable.
Figure 4B:
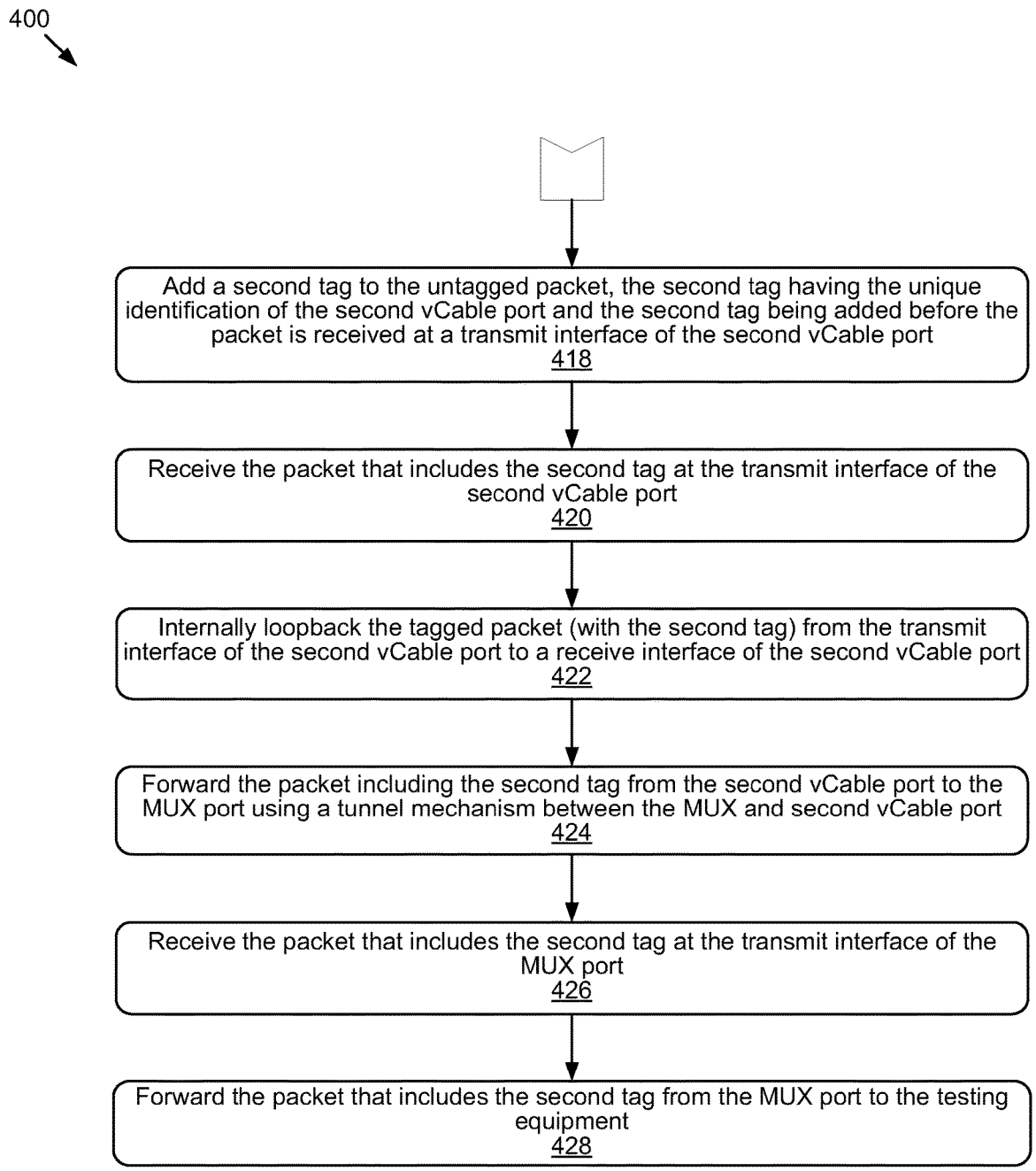

FIGS. 4A-4B illustrate flow diagrams of one embodiment of a process 400 of communicating packets with one or more vCable ports of a network element without the one or more vCable ports of the network element being connected to another device by a physical cable. In particular, FIG. 4A illustrates blocks 402, 404, 406, 408, 410, 412, 414, and 416 of process 400, while FIG. 4B illustrates blocks 418, 420, 422, 424, 426, and 428 of process 400. In one embodiment, the vCable port(s) described in FIGS. 4A-4B can be any of the vCable ports 106A-N described above in connection with at least one of FIGS. 1-3. The network element in FIGS. 4A-4B can be the network element 102 described above at least one of FIGS. 1-3.

In one embodiment, the process 400 is performed by the network element 102 described above in connection with at least one of FIGS. 1-3. In one embodiment, the process 400 is performed by one or more packet processors of the network element 102, as described above in connection with at least one of FIGS. 1-3. For example, and in one embodiment, at least one block of process 400 is performed by at least one of the packet processor 303 or the packet processor 309 of the network element 102, as described above in connection with FIG. 3.

In FIG. 4, process 400 begins by receiving a packet on a MUX port at block 402 of FIG. 4A. In one embodiment, process 400 receives a packet on or at a MUX port of the network element that is coupled to testing equipment by a physical cable as described in at least one of FIGS. 1-3. In one embodiment, the packet received at block 402 can include a first tag having a unique identification of a first vCable port of multiple vCable ports, as described above in connection with at least one of FIG. 1, 2, or 3. In an alternate embodiment, the packet received can be untagged, as described above in connection with at least one of FIG. 1, 2, or 3. At block 404, if the packet does not include the first tag, process 400 adds the first tag, as described in at least one of FIG. 1, 2, or 3. At block 406, process 400 determines based on a processing of the packet that includes the first tag that the packet is to be transmitted to the first vCable port of the multiple vCable ports. In one embodiment, process 400 determines the packet processing as described in at least one of FIG. 1, 2, or 3.

At block 408, process 400 forwards the tagged packet from the MUX port to the first vCable port using a tunnel mechanism between the MUX and the first vCable port. In one embodiment, process 400 forwards the tagged packet using a tunnel as described in at least one of FIGS. 1-3. At block 410, process 400 removes the first tag from the packet before the packet is received at a transmit interface of the first vCable port. In one embodiment, process 400 forwards the packet as described in at least one of FIGS. 1-3. At block 412, process 400 receives the untagged packet at the transmit interface of the first vCable port as described in at least one of FIGS. 1-3.

At block 414, process 400 internally loops back the untagged packet from the transmit interface of the first vCable port to a receive interface of the first vCable port. In one embodiment, the first vCable port is configured to loop back untagged packets transmitted on the transmit interface of the first vCable port as described in at least one of FIGS. 1-3. At block 416 of FIG. 4A, process 400 forwards the untagged packet from the first vCable port to a second vCable port as described in at least one of FIGS. 1-3.

Referring now to block 418 of FIG. 4B, where process 400 adds a second tag to the untagged packet. In one embodiment, the second tag has the unique identification of the second vCable port and the second tag is added before the packet is received at a transmit interface of the second vCable port in accordance with at least one of the descriptions provided above in connection with at least one of FIGS. 1-3. At block 420, process 400 receives the newly tagged packet (with the second tag) at the transmit interface of the second vCable port as described in at least one of FIGS. 1-3. At block 422, process 400 internally loops back the tagged packet having the second tag from the transmit interface of the second vCable port to a receive interface of the second vCable port. In one embodiment, the second vCable port is configured to loop back packets having the second tag and transmitted on the transmit interface of the second vCable port as described in at least one of FIGS. 1-3. At block 424, process 400 forwards the tagged packet having the second tag from the second vCable port to the MUX port as described in at least one of FIGS. 1-3. Process 400, at block 424, receives the tagged packet having the second tag at the transmit interface of the MUX port as described in at least one of FIGS. 1-3. At block 428, process 400 forwards the newly tagged packet (with the second tag)

to the testing equipment from the transmit interface of the MUX port as described in at least one of FIGS. 1-3.

FIG. 5 is a block diagram of one embodiment of a packet 500 including a tag 517 that is processed by a network element 102 for communicating the packet 500 with one or more vCable ports of the network element without the one or more vCable ports being connected to another device by a physical cable.

In one embodiment, the packet 500 is a frame, such as but not limited to an Ethernet frame or a Point-to-Point Protocol (PPP) frame. In one embodiment, the packet 500 is a frame 519, which includes a header 521 that includes a Virtual Local Area Network (VLAN) tag 517. In one embodiment, the VLAN tag 517 includes a tag protocol identifier (TPID) 507 having a predetermined value and a tag control information (TCI) 509 that includes a unique port identification for one or more vCable ports.

The header 521 stores information used by the networking element to make forwarding and/or other processing decisions (e.g., the network element 102 described above in at least one of FIGS. 1-3). The header 521 can include a preamble 501A, a start frame delimiter (SFD) 501B, a destination address 503, a source address 505, a tag 517, and a length/type 511.

The preamble 501A includes a predetermined number of bytes (e.g., 7 bytes) of a synchronization pattern consisting of alternating 1's and 0's that are used to ensure receiver synchronization. The SFD 501B is a predetermined number of bytes (e.g., an eight-bit or one byte) value marking the end of the preamble 501A and indicating the beginning of an Ethernet frame.

The destination address 503 stores an address of a destination station for the packet 500. The source address 505 stores the address of the originating station. In one embodiment, the length/type 511 specifies the number of information bytes being supplied by the data payload 513 or the protocol type. The data payload 513 stores the data to be transported in the network. In one embodiment, the Cyclic Redundancy Check (CRC) 515 includes a cyclic redundancy check code for error detection.

The header 521 can further include priority and VLAN identifier data in a VLAN tag 517. In one embodiment, the VLAN tag 517 is an outer VLAN tag that is inserted into the original frame 519. The VLAN tag 517 includes a tag protocol identifier (TPID) 507 and a tag control information (TCI) 509. In one embodiment, the TPID 507 is for identification and implementation of a protocol that enables communicating packets between a MUX port and one or more vCable ports. In one embodiment, the TPID 507 is preset to have a specified value (e.g., 0×8888, 0×8100, etc.). In one embodiment, the protocol identified and implemented by the TPID 507 having the preset value (e.g., 0×8888, 0×8100, etc.) is configured in a networking element (e.g., the network element 102 described above in at least one of FIG. 1, 2, or 3). In one embodiment, the protocol designated by the preset value of the TPID 507 is a modification of the IEEE 802.1Q standard for VLANs on an Ethernet network, which lacks the functionality of trunk ports. For example, and in one embodiment, the preset value of the TPID 507 is a value of 0×8888 or 0×8100 to prevent trunk ports or trunking.

In one embodiment, the TCI 509 includes the following three separate pieces of information: (i) a VLAN identifier (VID); (ii) a priority field; and (iii) a canonical format indicator (CFI). The VID uniquely identifies the VLAN to which the frame 519 belongs. In one embodiment, the VID maps the unique port identifications for one or more vCable ports. In one embodiment, the VID is replaced with the unique port identifications for one or more vCable ports. In one embodiment, a networking element communicates the packet between the MUX port and one or more vCable ports of the networking element using the VID stored in the packet. In one embodiment, the VIDs of a network element are reserved prior to communication of packets between the network element and another device (e.g., testing equipment). In this embodiment, the reserved VIDs are used as the unique port identifications for one or more vCable ports of the network element. In addition, in this embodiment, the VIDs that are used to identify vCable ports are excluded from regular bridging VLANs. In one embodiment, when the VID has a null value, the VID indicates that the tag header contains user priority information and no VID, thus, there is no identification of a vCable port.

The following Pseudo-Code 1 provides an exemplary embodiment of a command-line interface configuration of a network element configured to insert a tag (e.g., VLAN tag 517 of FIG. 5) into a packet (e.g., packet 500 of FIG. 5).

Pseudo-Code 1:

```
virtual-cable
  tpid 0x88a8
  mux-port ethernet 3/1
    loopback-port ethernet 3/2-48 port-id 102-148
    no shut
  mux-port ethernet 4/1
    loopback-port ethernet 4/2-48 port-id 202-248
    no shut
```

The priority field is made up of a three-bit designation, which allows eight different values so that eight different priorities are available. In one embodiment, the priority field is represented by priority values 0 through 7. For example and in one embodiment, the eight different priority fields are as follows: 0, best effort; 1, background; 2, spare; 3, excellent effort; 4, controlled load; 5, video; 6, voice; and 7, network control. In one embodiment, the standard priority indicators of the priority field are used to dictate the priority handling assigned to a packet.

The CFI is a one-bit designation that may or may not be set. In one embodiment, when the CFI is set, the embedded source-routing information field (E-RIF) is present and the bit determines whether mac address information carried by the frame 519 is in canonical or non-canonical format. In one embodiment, when the CFI is not set, the E-RIF will not be present and all mac information carried by the frame 519 is in canonical format.

Figure 6:
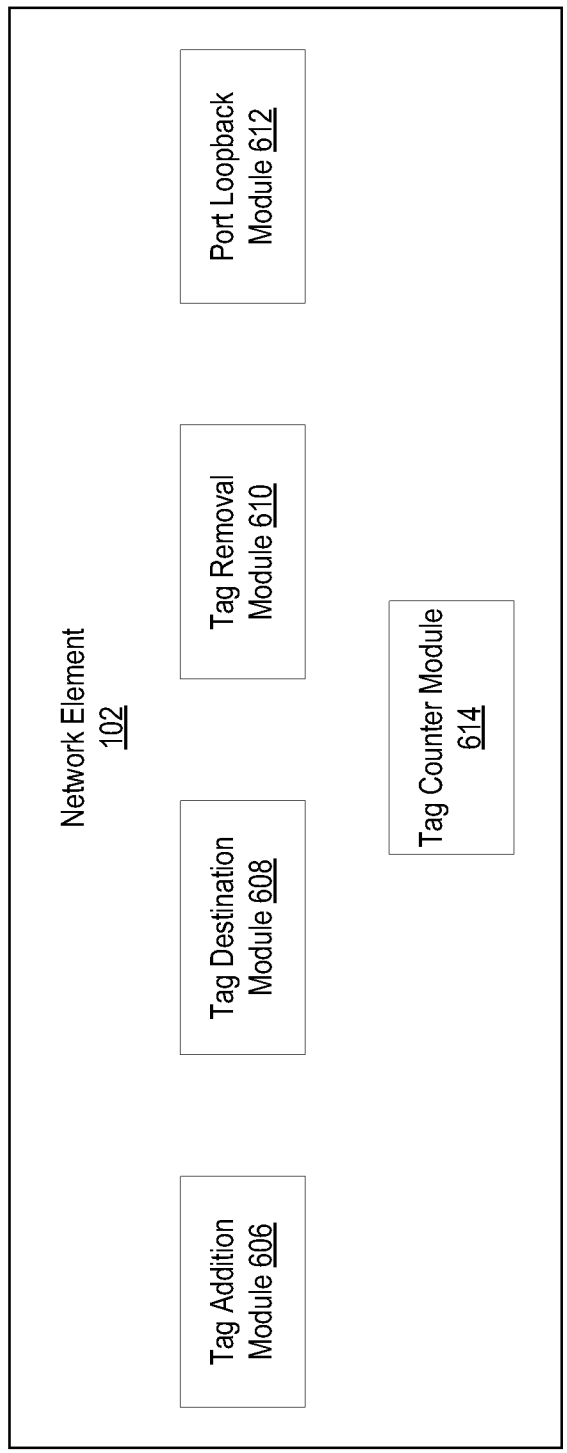
FIG. 6 is a block diagram of one embodiment of a network element including a plurality of modules configured to communicate packets with a port of the network element without the port of the network element being connected to another device by a physical cable.

FIG. 6 is a block diagram 600 of one embodiment of a network element 102 including a plurality of modules configured to communicate packets with one or more vCable ports (e.g., vCable ports 106A-N) of the network element 102 without the one or more vCable ports (e.g., vCable ports 106A-N) being connected to another device (e.g., test equipment 211) by a physical cable.

In one embodiment, the network element 102 is similar to or the same as the network elements described in connection with at least one of FIGS. 1-5. In one embodiment, the networking element includes at least one of a tag addition module 606, a tag destination module 608, a tag removal module 610, a port loopback module 612, or a tag counter module 614. Each of the modules 606, 608, 610, 612, and 614 can be implemented using one or more processing devices of the networking element 102. For example, and in one embodiment, at least one of a tag addition module 606, a tag destination module 608, a tag removal module 610, a port loopback module 612, or a tag counter module 614 is implemented by at least one of the packet processors associated with a port of the networking element 102, as described above in connection with FIGS. 1-3.

The modules 606, 608, 610, 612, and 614 of the network element 102 can be categorized in three groups based on three phases of testing a vCable port. The first phase, which cover interactions between the MUX port and the first vCable port being tested, is performed by a first group made up of the tag destination module 608, the tag removal module 610, the port loopback module 612, and the tag counter module 614. The second phase, which covers the interactions between the first vCable port being tested and the second vCable port that receives the untagged packet from the first vCable port, is performed by a second group made up of the tag addition module 606, the tag destination module 608, the port loopback module 612, and the tag counter module 614. The third group, which covers interactions between second vCable port and the MUX port, is performed by a third group made up of the tag destination module 606 only.

In one embodiment, the tag addition module 606 adds a tag to a packet as described above in block 404 of FIG. 4A and block 418 of FIG. 4B. In one embodiment, the tag destination module 608 processes a packet including a tag, determines a specific destination for the packet, and forwards the packet to the determined destination as described above blocks 406, 408, and 416 of FIG. 4A and in blocks 424 and 428 of FIG. 4B. In one embodiment, the tag removal module 610 removes a tag from a packet as described above in block 410 of FIG. 4A. In one embodiment, the port loopback module 612 internally loops back an untagged packet or a packet tagged with the second tag within a vCable port as described above in block 414 of FIG. 4A and in block 422 of FIG. 4B. In one embodiment, the tag counter module 614 counts the number of times a packet is received by a MUX port or a vCable port as described above in FIG. 3.

Figure 7:
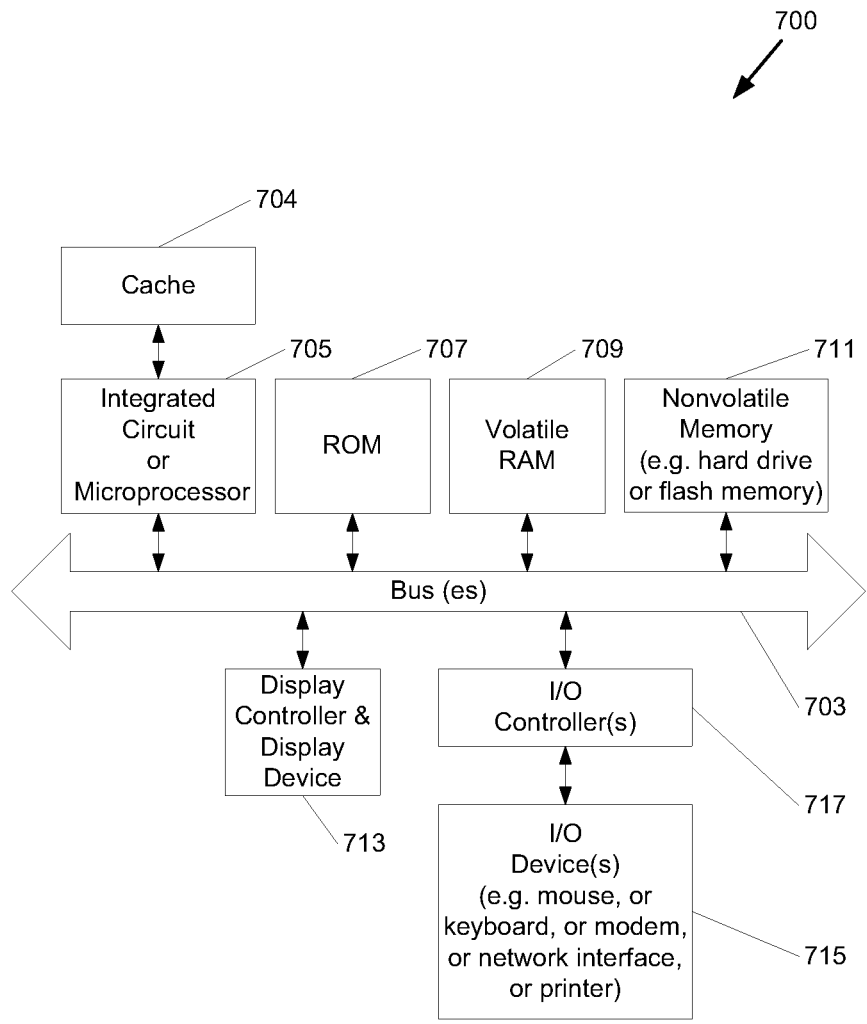
FIG. 7 illustrates one example of a typical computer system, which may be used in conjunction with the embodiments described herein.

FIG. 7 shows one example of a data processing system 700, which may be used with one embodiment of the present invention. For example, the system 700 may be implemented including a network element 102 as shown or described in at least one of FIGS. 1-6. Note that while FIG. 7 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may be used with the present invention.

As shown in FIG. 7, the computer system 700, which is a form of a data processing system, includes a bus 703 that is coupled to a microprocessor(s) 705, a ROM (Read Only Memory) 707, volatile RAM 709, and a non-volatile memory 711. The microprocessor 705 may retrieve the instructions from the memories 707, 709, 711 and execute the instructions to perform operations described above. The bus 703 interconnects these various components together and also interconnects these components 705, 707, 709, and 711 to a display controller and display device 717 and to peripheral devices such as input/output (I/O) devices which may be mice, keyboards, modems, network interfaces, printers and other devices which are well known in the art. In one embodiment, the system 700 includes a plurality of network interfaces of the same or different type (e.g., Ethernet copper interface, Ethernet fiber interfaces, wireless, and/or other types of network interfaces). In this embodiment, the system 700 can include a forwarding engine to transmit network date received on one interface out another interface.

Typically, the input/output devices 715 are coupled to the system through input/output controllers 713. The volatile RAM (Random Access Memory) 709 is typically implemented as dynamic RAM (DRAM), which requires power continually in order to refresh or maintain the data in the memory.

The mass storage 711 is typically a magnetic hard drive or a magnetic optical drive or an optical drive or a DVD RAM or a flash memory or other types of memory systems, which maintain data (e.g. large amounts of data) even after power is removed from the system. Typically, the mass storage 711 will also be a random access memory although this is not required. While FIG. 7 shows that the mass storage 711 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 703 may include one or more buses connected to each other through various bridges, controllers, and/or adapters as is well known in the art.

Portions of what was described above may be implemented with logic circuitry such as a dedicated logic circuit or with a microcontroller or other form of processing core that executes program code instructions. Thus, processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 8:
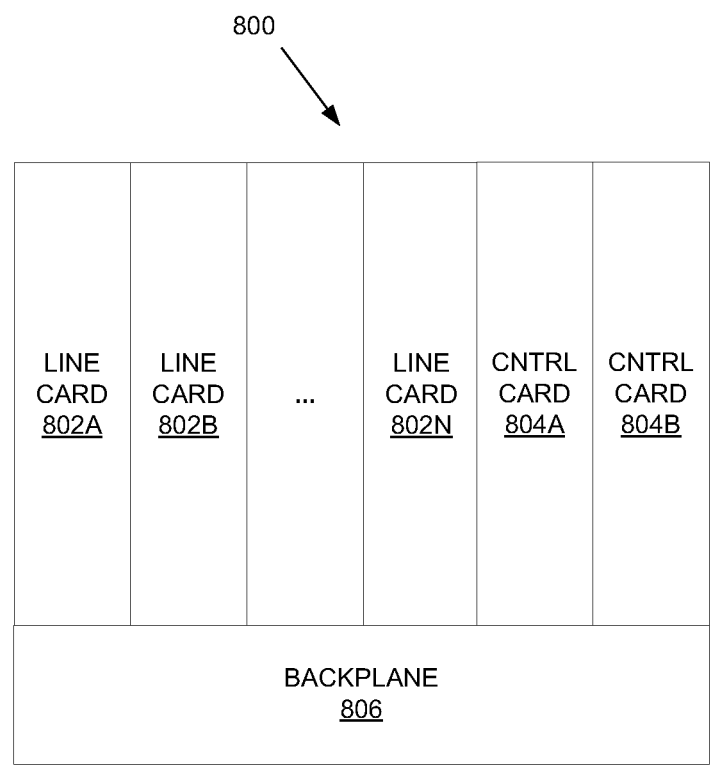
FIG. 8 is a block diagram of one embodiment of an exemplary network element that is configured to communicate packets with a port of the exemplary network element without the port being connected to another device by a physical cable.

FIG. 8 is a block diagram of one embodiment of an exemplary network element that is configured to communicate packets with a port of the exemplary network element without the port being connected to another device by a physical cable. In FIG. 8, the backplane 806 couples to the line cards 802A-N and controller cards 804A-B. While in one embodiment, the controller cards 804A-B control the processing of the traffic by the line cards 802A-N, in alternate embodiments, the controller cards 804A-B, perform the same and/or different functions (e.g., transmitting packets to a vCable port from a MUX port, receiving packets from a vCable port at a MUX port, inserting a tag into packet, removing a tag from a packet, etc.). In one embodiment, at least one of the line cards 802A-N or the controller cards 804A-B is configured to insert or add tags into generated packets; analyze tags to determine which one of vCable ports is to receive a generated packet; remove tags from a packet; communicate packets between the testing equipment, a MUX port, and one or more vCable ports; and activate or deactivate a loopback mode within the MUX port or one or more vCable ports. In one embodiment, the line cards 802A-N process and transmit traffic according to the network policies received from the controller cards 804A-B. It should be understood that the architecture of the network element 800 illustrated in FIG. 8 is exemplary, and different combinations of cards may be used in other embodiments of the invention.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "retrieving," "locating," "determining," "forwarding," "reading," "adding," "incrementing," "modifying," "transmitting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Processes and displays presented herein are not inherently related to any particular computer or other apparatus. Many general-purpose systems may be used with programs in accordance with the teachings herein, or it may prove convenient to construct a more specialized apparatus to perform the operations described. The required structure for a variety of these systems will be evident from the description provided herein. The present invention is not described with reference to any particular programming language. It will be appreciated that a variety of programming languages may be used to implement the present invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method to test a first port of a network device without the first port being connected to another device by a physical cable, the method comprising:

receiving a packet that includes a first tag at a second port of the network device, the first tag including a unique identification of the first port and the packet including the first tag being generated by a testing equipment that is coupled to the second port of the network device, wherein the first and second ports are physical ports of the network device, wherein the first and second ports are part of and coupled within the network device to the one or more processing units of the network device;

determining, based on the first tag, that the packet is to be communicated to the first port, the determination being performed by the network device;

forwarding the packet that includes the first tag from the second port to the first port based on the determination using a tunnel internal to the network device, the tunnel having endpoints at the first and second ports, the forwarding of the packet being performed by the network device;

removing the first tag from the packet, the removal of the first tag being performed before the forwarding of the packet from the second port to the first port; and transmitting the packet that lacks the first tag out of a transmit interface of the first port, wherein the first port is in loopback mode and the packet is received by a receive interface of the first port without the first port being connected to another device by a physical cable.

2. The non-transitory machine-readable medium of claim 1, wherein the method further comprises:

forwarding the packet that lacks the first tag from the first port to the second port, the forwarding of the packet that lacks the first tag being performed by the network device;

adding a second tag to the packet, the second tag including the unique identification of the first port; and transmitting the packet that includes the second tag to the test equipment.

3. The non-transitory machine-readable medium of claim 2, wherein, when the adding of the second tag to the packet is performed during the forwarding of the packet that lacks the first tag, the method further comprises:

adding the second tag to the packet before the packet is received at a transmit interface of the second port.

4. The non-transitory machine-readable medium of claim 1, wherein, when the removal of the first tag is performed during the forwarding of the packet from the second port to the first port, the method further comprises:
removing the first tag from the packet before the packet is received at the transmit interface of the first port.

5. The non-transitory machine-readable medium of claim 2, wherein the method further comprises:
counting at least one of each packet that is communicated to or from an ingress module associated with the first port, an ingress module associated with the second port, an egress module associated with the first port, or an egress module associated with the second port.

6. The non-transitory machine-readable medium of claim 5, wherein the counted packets do not include at least one of the first tag or the second tag.

7. The non-transitory machine-readable medium of claim 2, wherein, when the packet includes at least one of the first tag or the second tag, the tunnel is selected from the group consisting of a point-to-point tunneling, a Q-in-Q tunneling, a multiprotocol label switching (MPLS) mechanism, a Generic Route Encapsulation (GRE) mechanism, and a point-to-point tunneling protocol (PPTP).

8. The non-transitory machine-readable medium of claim 1, wherein the packet is a frame.

9. The non-transitory machine-readable medium of claim 8, wherein the frame is selected from the group consisting of an Ethernet frame and
a Point-to-Point Protocol (PPP) frame.

10. The non-transitory machine-readable medium of claim 1, wherein the first tag is a Virtual Local Access Network (VLAN) tag and the unique identifier of the first port is part of the VLAN tag.

11. The non-transitory machine-readable medium of claim 1, wherein the first tag includes an identification of a protocol that enables communication between the first port and second port.

12. A computer-implemented method of testing a first port of a network device without the first port being connected to another device by a physical cable, the method comprising:
receiving a packet that includes a first tag at a second port of the network device, the first tag including a unique identification of the first port and the packet including the first tag being generated by a testing equipment that is coupled to the second port of the network device, wherein the first and second ports are physical ports of the network device, wherein the first and second ports are part of and coupled within the network device to the one or more processing units of the network device;
determining, based on the first tag, that the packet is to be communicated to the first port, the determination being performed by the network device;
forwarding the packet that includes the first tag from the second port to the first port based on the determination using a tunnel internal to the network device, the tunnel having endpoints at the first and second ports, the forwarding of the packet being performed by the network device;
removing the first tag from the packet, the removal of the first tag being performed before the forwarding of the packet from the second port to the first port; and
transmitting the packet that lacks the first tag out of a transmit interface of the first port, wherein the first port is in loopback mode and the packet is received by a receive interface of the first port without the first port being connected to another device by a physical cable.

13. The computer-implemented method of claim 12, wherein the method further comprises:
forwarding the packet that lacks the first tag from the first port to the second port, the forwarding of the packet that lacks the first tag being performed by the network device;
adding a second tag to the packet, the second tag including the unique identification of the first port; and
transmitting the packet that includes the second tag to the testing equipment.

14. The computer-implemented method of claim 13, wherein, when the adding of the second tag to the packet is performed during the forwarding of the packet that lacks the first tag, the method further comprises:
adding the second tag to the packet before the packet is received at a transmit interface of the second port.

15. The computer-implemented method of claim 13, wherein, when the removal of the first tag is performed during the forwarding of the packet from the second port to the first port, the method further comprises:
removing the first tag from the packet before the packet is received at the transmit interface of the first port.

16. The computer-implemented method of claim 13, wherein the method further comprises:
counting at least one of each packet that is communicated to or from an ingress module associated with the first port, an ingress module associated with the second port, an egress module associated with the first port, or an egress module associated with the second port.

17. The computer-implemented method of claim 16, wherein the counted packets do not include at least one of the first tag or the second tag.

18. The computer-implemented method of claim 13, wherein, when the packet includes at least one of the first tag or the second tag, the tunnel is selected from the group consisting of a point-to-point tunneling, a Q-in-Q tunneling, a multiprotocol label switching (MPLS) mechanism, a Generic Route Encapsulation (GRE) mechanism, and a point-to-point tunneling protocol (PPTP).

19. The computer-implemented method of claim 12, wherein the packet is a frame.

20. The computer-implemented method of claim 19, wherein the frame is selected from the group consisting of an Ethernet frame and a Point-to-Point Protocol (PPP) frame.

21. A system for testing a first port of a network device without the first port being connected to another device by a physical cable, the system comprising:
a testing equipment connected to a second port of the network device via a physical cable, the testing equipment being configured to:
communicate a packet that includes a first tag with the second port, wherein the first tag includes a unique identification of the first port, and wherein the first and second ports are physical ports of the network device; and
the network device including one or more processing devices, the one or more processing devices being configured to:
receive a packet that includes a first tag at a second port of the network device, the first tag including a unique identification of the first port and the packet including the first tag being generated by a testing equipment that is coupled to the second port of the network device, wherein the first and second ports are physical ports of the network device, wherein the first and second ports are part of and coupled within the network device to the one or more processing units of the network device;

determine, based on the first tag, that the packet is to be communicated to the first port, the determination being performed by the network device;

forward the packet that includes the first tag from the second port to the first port based on the determination using a tunnel internal to the network device, the tunnel having endpoints at the first and second ports, the forwarding of the packet being performed by the network device;

remove the first tag from the packet, the removal of the first tag being performed before the forwarding of the packet from the second port to the first port; and transmit the packet that lacks the first tag out of a transmit interface of the first port, wherein the first port is in loopback mode and the packet is received by a receive interface of the first port without the first port being connected to another device by a physical cable.

22. The system of claim 21, wherein the one or more processing devices included in the network device are further configured to:

forward the packet that lacks the first tag from the first port to the second port, the forwarding of the packet that lacks the first tag being performed by the network device;

add a second tag to the packet, the second tag including the unique identification of the first port; and transmit the packet that includes the second tag to the testing equipment.

23. The system of claim 22, wherein, when the packet includes at least one of the first tag or the second tag, the packet is communicated between the first and second ports through a tunnel, the tunnel is selected from the group consisting of a point-to-point tunneling, a Q-in-Q tunneling, a multiprotocol label switching (MPLS) mechanism, a Generic Route Encapsulation (GRE) mechanism, and a point-to-point tunneling protocol (PPTP).

* * * * *